Nov. 30, 1971     W. N. CARSON, JR     3,623,914
METAL ANODE PACKAGE

Filed Feb. 19, 1970     2 Sheets-Sheet 1

WILLIAM N. CARSON, JR.
INVENTOR.

BY
Attorney

WILLIAM N. CARSON, JR.
*INVENTOR.*

3,623,914
METAL ANODE PACKAGE

William N. Carson, Jr., Schenectady, N.Y., assignor to the United States of America as represented by the Secretary of the Navy
Filed Feb. 19, 1970, Ser. No. 12,646
Int. Cl. H01m 29/04
U.S. Cl. 136—120 FC    4 Claims

ABSTRACT OF THE DISCLOSURE

A salt package is provided for use with mechanically rechargeable primary metal-air cells. The salt package is formed from a binder-salt mixture spread as a dry solid on a portion of the nonconductive webbing which serves as a cell separator and which surrounds the replaceable metal anode. The binder, which rapidly disintegrates when wetted, is selected to be nonreactive with cell components and to provide a durable solid when dry. Means for simultaneous insertion of the salt package and replaceable anode are provided.

---

The invention described herein may be manufactured and used by or for the Government of the United States of America for governmental purposes without the payment of any royalties thereon or therefor.

This invention relates to mechanical rechargeable oxygen depolarized metal-air cells and, more particularly, to a salt package which is simultaneously inserted with a fresh anode when the cell is recharged.

Mechanically rechargeable primary metal-air cells are recharged by the insertion of a fresh metal anode into the cell and the introduction of reconstituted electrolyte. In some metal-air cells, the reconstituted electrolyte is salt water. These batteries are normally recharged by inserting the fresh anode and then adding both salt and water to the cells. The separate adding of the electrolyte components is, however a cumbersome procedure which results in the need either to dissolve salt in a separate container or to parcel out salt to each cell. If the salt collects at the bottom of the cell, adequate mixing with water cannot be achieved within a desirable time period. When salt is added by means of a salt tablet carried on a fresh anode, metal-air batteries may be recharged by the mere addition of water to the mechanically recharged cells. When a salt tablet is used to supply one of the electrolyte constituents, a premeasured quantity of salt is introduced into each cell at the same time a fresh anode is inserted.

Magnesium-air cells are one of a group of metal-air cells which use a saltwater electrolyte. They are used in combat applications not only because of their light weight and high output but also because they may be quickly recharged under combat conditions. Recharging may be done in the field by merely inserting the above-mentioned anodes and by dipping the entire battery into salt water if salt water is available. When these batteries are used on inland combat missions, salt water is generally not available. The present invention permits recharging by dipping the entire battery into a freshwater supply. Salt is introduced into the cell in the form of a salt tablet carried on the fresh anode. This salt is held in a low-mass binder which promotes dissolution when either freshwater or salt water is added.

It will be appreciated that in magnesium-air cells there is a minimum amount of salt that must be present in the electrolyte. Overages of salt will not, however, significantly affect battery performance. Thus, batteries which employ these salt packages may also be dipped in salt water. The use of the salt package only ensures that the minimum amount of salt will be present in the electrolyte. The salt tablet herein described may be used in mechanically recharging a variety of metal-air cells such as aluminum-air and iron-air cells since they employ saltwater electrolytes.

When the salt is packaged according to the teachings of this invention, it is easily inserted into the battery cell and is prevented from coming into contact directly with the air-electrode.

In the preferred embodiment, the nonreactive binder is pulped filter paper. Other binders, which both felt and at the same time provide a matrix in which the salt may be trapped, include inert, fibrous, cellulosic materials insoluble in saline water. In the preferred embodiment the salt and filter paper pulp are mixed either dry or wet and are wetpressed into sheets suitable for insertion into the anode package. Either water or alcohol may be used in the wet-pressing process. In order to avoid corrosion of the magnesium anode, alcohol is preferred because is ensures that the salt tablet will be dry when it is placed next to the anode. A thin sheet of unsalted filter paper may be secured to the salt tablet to protect the magnesium anode from direct contact with the salt to further inhibit corrosion of the anode. The salt tablet formed in this manner may also be wet-pressed into a polyethylene expanded matrix which serves as a spacer between the cellophane separator and the anode. By wet-pressing this salt tablet into this expanded matrix, the salt tablet is held in position with respect to the anode and the structural stability of the salt tablet is increased.

It is therefore an object of this invention to provide a salt package deposited on or adjacent to a fresh metal anode which is inserted into a metal-air primary cell to mechanically recharge the cell.

It is a further object of this invention to provide a nonreactive wood pulp binder for salt which is wet-pressed into a sheet or tablet for insertion into an oxygen depolarized metal-air cell.

It is another object of the present invention to provide a combined package for mechanically recahrging a metal-air cell which contains a fresh anode and a salt tablet secured adjacent the anode.

It is a still further object of this invention to provide a method for recharging a primary metal-air cell involving the simultaneous insertion of a salt package and a fresh anode into the cell to be recharged and then adding water.

Other objects, advantages and novel features of the invention will become apparent from the following detailed description thereof when considered in conjunction with the accompanying drawings in which like numerals represent like parts throughout and wherein.

Figure 1:
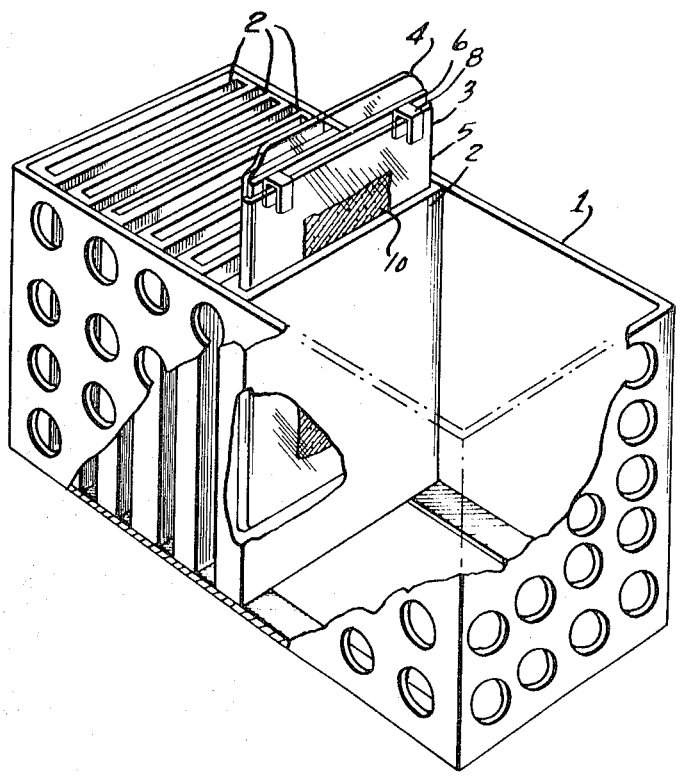
FIG. 1 is a diagram showing the insertion of a fresh anode and a salt tablet into one of the metal-air cells of an oxygen depolarized metal-air cell battery.

Referring to FIG. 1, a battery casing 1 is shown housing a multiplicity of metal-air cells 2. Into one of these cells is shown the insertion of a fresh anode package 3 for mechanically recharging the cell. In order to recharge the individual cells of this battery, the spent anode is removed by pulling on tab 4 of the cellophane envelope 5 which surrounds metal anode 6. This envelope, which may be made of any nonreactive microporous material having a high degree of electrolytic conductivity, is also useful in containing and removing any flocculent material formed at the anode-electrolyte interface. When the envelope and the spent anode are removed by pulling on tab 4, the flocculent material is simultaneously removed. In the case of magnesium anodes, this flocculent material is magnesium hydroxide.

Figure 2:
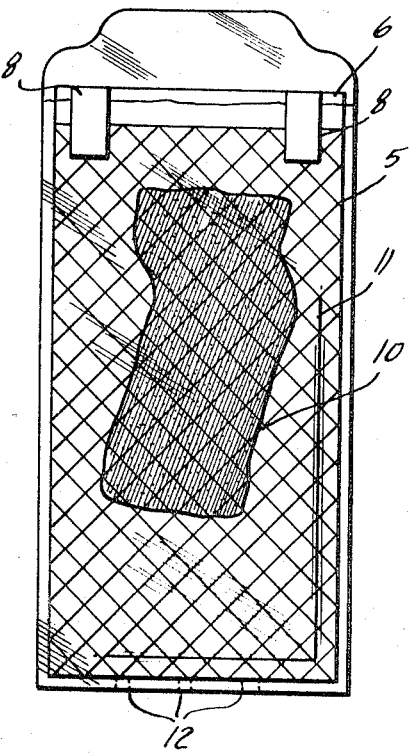
FIG. 2 is a diagram of the entire metal anode package showing the salt tablet wet-pressed into an expanded polyethylene mesh spacer which is inserted along with the metal anode into a cellophane envelope.

FIG. 2 shows metal anode 6 and connector clips 8 secured to the top of the anode. The connector clips extend beyond a portion 9 of the cellophane envelope 5 and are used to serially connect the cells in the completed battery. On either side of metal anode 6, an expanded polypropylene mesh 11 serves as a spacer between anode 6 and the wall portions of the cellophane envelope. Salt tablet 10 is wet-pressed into this expanded mesh. At the bottom of the cellophane envelope are holes 12 which allow water added to the cell to reach the salt tablet. In the preferred embodiment, two expanded mesh spacers are inserted, one on either side of the metal anode. Each of these spacers has wet-pressed into it the salt tablet to be described. In the preferred configuration, the salt tablet is made of 5% analytical grade filter paper pulp and 95% salt. It will be appreciated that any kind of paper pulp including repulped paper towels may be used as the binding material. If material other than analytical grade filter paper is used, the paper is washed to rid it of its sizing or bulking material before it is pulped. The pulp and the salt in the above proportions are then mixed in a beaker with enough water to form a stiff paste. This stiff paste is then spread by a spatula either on filter paper which acts to bind the salt together or onto mesh 11. The dried pulp acts as a matrix to which the salt adheres and which promotes the dissolution of the salt by expanding and breaking apart when a quantity of water is aded to the cell. In a cell having a volume of 90 cubic centimeters, 11 to 12 cubic centimeters of the salt-pulp mixture are enough to make an 11 to 15% NaCl solution. Other percentages of filter paper pulp and salt will produce a structurally adequate salt tablet since these percentages are not critical. It will be appreciated that the paper pulp binder is effective in low masses and thus does not add significant weight to the battery. The paper pulp binder is also nonreactive to all the components of the battery and promotes dissolution by expanding when wetted. When the binder expands, it also fragments the salt tablet.

Within the scope of this invention, other types of binders may be used. Among these are starches which are somewhat soluble in water. One of these is beta amylose. Although silica gel may not be used instead of the pulp for the binder, silicon dioxide made by a fuming process may be used as a binding material. In this process, silicon tetrachloride is subjected to steam which produces a fluffy type binding material. Such a fluffy material is available under the trade names Cab-O-Sil or Celite, trademark products of the Cabot Corporation and the Johns-Manville Corporation, respectively. Silica binding materials do not work as well as the pulp because of their weight and because they do not break up as readily on wetting. In general, the binding material must have a large surface area and be inert. In this respect, diatomaceous earth, cotton linters or short staple rayon may be used as binding materials or, indeed, any material which tends to felt and which will provide a matrix into which the salt may be trapped.

The expanded mesh may be made of polyethylene or other nonreactive plastic or textile materials. In this respect, Teflon, polypropylene, nylon, polystyrene, rubber, polyvinyl chloride and rayon expanded meshes may be used to prevent crumbling of the salt package when the anode is inserted into the cell.

Figure 3:
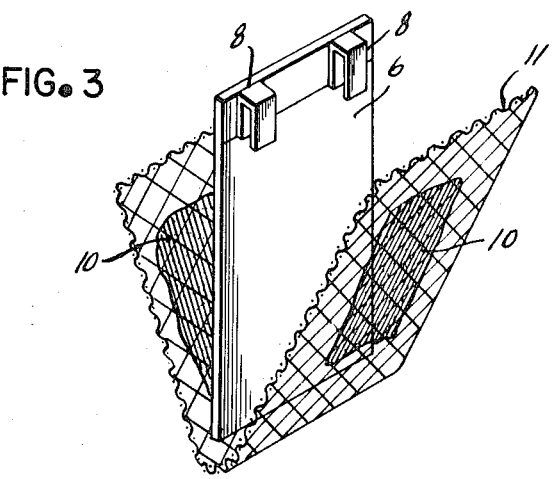
FIG. 3 is a diagram showing one method of inserting the mesh spacer into the cellophane envelope.

As shown in FIG. 3, this mesh may be folded around anode 6 such that the fold is adjacent the bottom edge of the envelope. In this configuration, the anode and spacer may be easily inserted into the cellophane envelope shown at 5 in FIG. 2.

Figure 4:
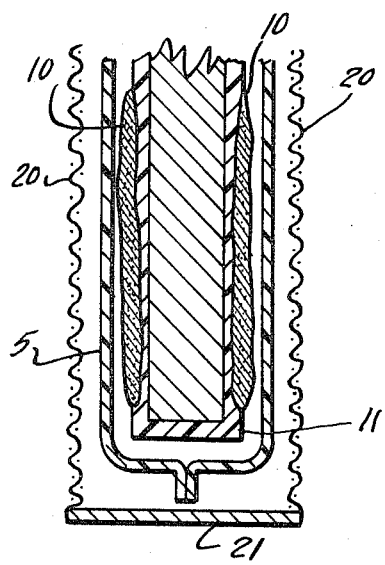
FIGS. 4, 5 and 6 show alternate embodiments of the invention in which the salt tablet is secured to the anode of the cell in three different ways.
Figure 5:
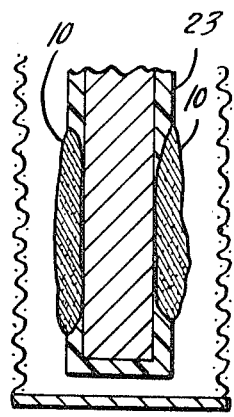
Figure 6:
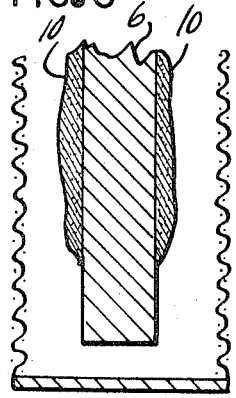

FIG. 4 shows a cross-sectional view of a metal-air cell. In this view, air cathodes 20 are attached to a metal base 21 and are of the type described in U.S. Pat. 3,297,484 to L. W. Niedrach, issued Jan. 10, 1967. A portion of the cellophane envelope 5 is shown enclosing anode 6 and salt tablets 10 which are wet-pressed onto filter paper 11 on either side of the anode. This filter paper prevents any moist portion of the salt tablets from contacting the anode and thus prevents pitting or corrosion of the anode when the salt tablet is subjected to the moisture in the surrounding air. If the salt tablet is completely dry, it may be bonded directly onto the anode 6 as shown in FIG. 6. Dry salt tablets may be formed by mixing the pulp salt slurry with alcohol rather than water to form a paste. Alternately, as shown in FIG. 5, the salt tablets may be wet-pressed into an expanded polyethylene mesh shown diagrammatically at 23. The salt tablet and anode combination may be inserted into the metal-air cell without first being placed in the aforementioned envelope. This direct insertion is shown in FIGS. 5 and 6. The envelope, however, serves as a convenient means for insertion and withdrawal of the anode and salt combination and may be used with the direct insertion configuration.

From FIGS. 4, 5 and 6, it can be seen that the salt may be held adjacent the fresh anode in a variety of ways so as to permit its insertion simultaneously with a fresh anode. It will be appreciated that the addition of loose salt is not a satisfactory way of adding the salt to the metal-air cell because it corrodes and pits not only the anode but also portions of the air cathode as well. The simultaneous insertion of a salt tablet and a fresh anode provides a convenient, reliable and noncorrosive method of mechanically recharging a metal-air cell which utilizes a salt water electrolyte.

What is claimed is:

1. Apparatus for mechanically recharging a primary metal-air cell comprising, in combination:
   a metal anode for insertion into said cell;
   a salt tablet comprising a mixture of a predetermined amount of salt and a low-mass binder which has been wet-pressed into tablet form and dried until solid, said binder being inert to the chemical constituents of said cell and insoluble in saline water, which felts upon contact with water and which provides a matrix into which said salt is trapped, whereby said binder disintegrates whenever it is immersed in water, thereby promoting dissolution of the salt trapped therein;
   a nonreactive, microporous envelope immediately surrounding said anode and tablet at the side and bottom portions of said anode such that said envelope encases said anode and tablet, maintains them in close proximity, and forms a package which is readily insertable into said cell, whereby the insertion of said package into said cell and the immersion of said cell into water complete the mechanical recharging process; and
   said package further including a nonreactive expanded mesh immediately adjacent said anode and into which said mixture of salt and binder is wet pressed.

2. The apparatus as recited in claim 1 wherein said package further includes a sheet of paper placed between said wet-pressed mixture and said anode to reduce corrosion of said anode due to moisture in the air surrounding said package.

3. The apparatus as recited in claim 1 wherein said package includes a nonreactive expanded mesh matrix immediately adjacent said anode and into which said mixture of salt and said paper pulp binder is wet-pressed.

4. The apparatus as recited in claim 3 wherein alcohol is the liquid used in wet-pressing the mixture of salt and paper pulp into said matrix.

References Cited
UNITED STATES PATENTS

| | | | |
|---|---|---|---|
| 2,040,255 | 5/1936 | Gordon | 136—155 X |
| 3,531,327 | 9/1970 | Moos | 136—86 A |

ALLEN B. CURTIS, Primary Examiner

U.S. Cl. X.R.

136—86A, 153